UNITED STATES PATENT OFFICE.

HERBERT W. C. TWEDDLE, OF PITTSBURG, PENNSYLVANIA.

IMPROVEMENT IN PETROLEUM PRODUCTS AND METHODS OF OBTAINING THE SAME.

Specification forming part of Letters Patent No. 189,401, dated April 10, 1877; application filed July 31, 1876.

*To all whom it may concern:*

Be it known that I, HERBERT W. C. TWEDDLE, of Pittsburg, in the county of Allegheny and State of Pennsylvania, have invented a new and useful Improvement in Petroleum Products and Methods of Obtaining the Same; and I do hereby declare the following to be a full, clear, and exact description thereof.

My invention relates to a new petroleum product, or "petroleum mastic," and to methods of obtaining the same.

In the distillation of crude petroleum by the usual processes, with either steam or fire heat, a residuum or tarry matter remains, or is left in the still, to the extent of from four per cent. (4%) to ten per cent. (10%) of the original quantity of (48° or similar gravity) oil treated. This residuum of the first distillation is subsequently redistilled to obtain the contained paraffine, and during the latter stages of this second distillation, an orange-colored resinous oily product is driven over, which is separated, and has heretofore been considered valueless, except as a lubricant for mill machinery, or like purposes.

The amount of orange-colored resinous oily matter given off from a charge of residuum during this redistillation will vary from four per cent. (4%) to ten per cent. (10%) of the original still contents. It is this orange-colored resinous oily matter which I utilize, and from which I obtain the new product, or petroleum mastic.

I proceed as follows: I take the orange-colored resinous oily matter and subject it to repeated washing, with either benzine, or the light oils from petroleum, or even the illuminating-oils, (I find benzine best adapted for the purpose,) and decant the liquid carefully, preserving the precipitate, which is "petrozcene," and is subject-matter of another application of even date herewith. The washings of the precipitate may be continued until the benzine or other liquid passes off uncolored thereby. The several washings, or all decanted liquids, are then placed in a suitable still, and distillation carefully conducted, so as to obtain the benzine without carbonizing, to any extent, the heavy oil separated from the petrozcene. The heavy oil which is thus left in the still is the new product, or petroleum mastic. It has a gravity of from 1° Baumé to 4° Baumé, but will vary according to the stage at which the distillation for the recovery of the benzine is stopped. It oxidizes rapidly, is of a very dark brownish-green color, and has very little odor. It can be used with or without driers as a paint-oil, and for varnish. It can be bleached and clarified, if necessary.

Having thus described my invention, what I claim, and desire to secure by Letters Patent, is—

1. As a new article of manufacture, the petroleum product hereinbefore described, and having the characteristics herein described.

2. The process herein described for obtaining a new product from petroleum, the same consisting in washing the orange-colored resinous oily product obtained toward the close of the distillation of tar residuum, and subsequently driving off the solvent and recovering the heavy oil, substantially as and for the purpose specified.

In testimony whereof I, the said HERBERT W. C. TWEDDLE, have hereunto set my hand.

HERBERT W. C. TWEDDLE.

Witnesses:
JAMES I. KAY,
F. W. RITTER, Jr.